Figure 1:

July 1, 1958  E. E. SENSEL  2,841,471

SYNTHESEIS OF SELECTIVE MINERAL SORBENTS

Filed Oct. 23, 1956

X-RAY PATTERN OF HYDRATED 4 ANGSTROM SORBENT

INTERPLANAR SPACINGS ("d" SPACINGS) IN ANGSTROM UNITS

United States Patent Office 2,841,471
Patented July 1, 1958

2,841,471

SYNTHESIS OF SELECTIVE MINERAL SORBENTS

Eugene E. Sensel, Beacon, N. Y., assignor to The Texas Company, New York, N. Y., a corporation of Delaware Application October 23, 1956, Serial No. 617,734

6 Claims. (Cl. 23—112)

This invention relates to a process for synthesizing a selective mineral sorbent having the empirical formula $Na_2O \cdot Al_2O_3 \cdot 2SiO_2 \cdot 4\text{-}5H_2O$.

This sorbent has the property of selectively sorbing vapors of lower molecular weight materials such as water, ethane, ethylene and propylene from mixtures of the same with larger molecules, e. g., non-straight chain hydrocarbons such as isoparaffinic, isoolefinic, naphthenic, and aromatic hydrocarbons. It is characterized broadly as having an effective pore size of approximately 4 Angstrom units, and, for convenience herein, will be called the 4 A. mineral sorbent. By ion exchanging a portion of the sodium component with certain divalent metal ions, e. g., calcium, zinc, cadmium, manganese, or strontium, in the structure of this 4 A. mineral sorbent, the effective pore size can be made to increase to about 5 Angstrom units. The resulting mineral sorbent, for convenience herein called 5 A. mineral sorbent, is useful in separating higher molecular weight normal paraffins, olefins, etc., from non-straight chain hydrocarbons, e. g., normal butane from isobutane, normal hexane from isoparaffinic hexanes, cyclohexane, and benzene, etc. In such process the selective mineral sorbent is contacted with the hydrocarbon mixture whereby it becomes laden with the straight-chain material; the laden sorbent can then be stripped, e. g., at elevated temperature with a light gas such as nitrogen, and sorbed materials recovered.

My process comprises maintaining an aqueous mixture of at least one soda-providing substance selected from the group consisting of sodium hydroxide and sodium aluminate, at least one alumina-providing substance selected from the group consisting of hydrous alumina and sodium aluminate, and at least one silica-providing substance selected from the group consisting of hydrous silica and finely-divided amorphous silica, e. g., "Cab-O-Sil" or "Hi-Sil," said mixture containing essentially stoichiometric quantities of aluminum, silicon, and sodium for the formulation $Na_2O \cdot Al_2O_3 \cdot 2SiO_2$, at temperature of 150°–325° F. and autogenous pressure for at least about 3 hours; and thereafter recovering the subject hydrated 4 A. sodium alumino-silicate as the resulting solid fraction.

By hydrous silica I mean the silica hydrogel and/or silica hydrosol commercially available and represented conventionally by the formula $SiO_2 \cdot xH_2O$. A conventional gel of this sort contains about 10% to 20% by weight $SiO_2$. The solid amorphous silica can be used in place of or together with either of such hydrous silicas. The alumina-providing substance I use is advantageously sodium aluminate, i. e. $NaAlO_2$ or $2NaAlO_2 \cdot 3H_2O$, for efficiency and economy in the practice of my invention. However, I can use also hydrous alumina, hydrogel and/or hydrosol, commercially available and represented conventionally by the formula $Al_2O_3 \cdot yH_2O$. Such material can contain up to about 20% by weight $Al_2O_3$. It is more expensive than sodium aluminate and has the disadvantage of forming some unreactive alpha or beta alumina trihydrate on standing. Unlike powdered solid amorphous silica, powdered alumina itself cannot be used in my synthesis.

The sodium aluminate I prefer to use is a commercial grade of sodium aluminate, $2NaAlO_2 \cdot 3H_2O$, a solid, which is rendered more water-soluble by the incorporation of about 2–5% by weight free NaOH. The water vehicle for the reaction ordinarily is furnished by the hydrous silica and any hydrous alumina used in forming the reaction mixture. If the amorphous silica powder is used instead of a hydrogel or sol of silica, 4–10 parts of water is advantageously added per part of such silica. The proportion of water (that is, free water and water of hydration) is advantageously at least about 75% of the total reaction mixture, and is preferably 80–90% by weight.

The reactants and water vehicle are conveniently mixed at about room temperature, and a creamy reaction mixture is formed. Additional water can be added if desired to facilitate mixing. It is most important that the silica- and alumina-providing substances added to the mixture be in essentially stoichiometric proportions for the formulation $Na_2O \cdot Al_2O_3 \cdot 2SiO_2$, i. e. the molar excess of equivalent silica or alumina should not be substantially greater than 5–10% in the reaction mixture. A little sodium hydroxide over and above the stoichiometric balance for said formulation can be tolerated, but it is preferred to have all the ingredients in the reaction mixture in as close to stoichiometric proportions as is possible using conventional metering equipment. Excess hydrous silica in the reaction mixture can remain as free silica or can be converted to compounds such as $$Na_2O \cdot Al_2O_3 \cdot 3SiO_2 \cdot 2H_2O$$

or $Na_2O \cdot Al_2O_3 \cdot 4SiO_2 \cdot 2H_2O$ (analcite) which contaminate the product and drastically impair the selectivity of a 5 A. sorbent for straight chain hydrocarbons from mixtures of straight chain and non-straight chain hydrocarbons made from such impure 4 A. sorbent product. Excess alumina-providing material in the reaction mixture can be converted into several types of alumina oxide depending upon the original source of the alumina-providing material and subsequent treatment of the resulting 4 A. sorbent product, and similarly can impair the selectivity of a 5 A. sorbent made therefrom. A little excess caustic soda is not too harmful because it can remain in the water solution and be washed out after the reaction is over, but substantial quantities of excess sodium hydroxide, e. g., 15% in excess for the formulation, can cause formation of impurities such as basic sodalite $$[3(Na_2O \cdot Al_2O_3 \cdot 2SiO_2) \cdot aNaOH \cdot bH_2O]$$

and other undesirable sodium alumino-silicates in the resulting sorbent.

The reaction of hydrous alumina, hydrous silica, and sodium hydroxide to form the sorbent can be represented by the equation:

(1) $2NaOH + Al_2O_3 \cdot yH_2O + 2SiO_2 \cdot xH_2O \xrightarrow{\text{water}}$
    sodium    hydrous    hydrous
    hydroxide  alumina   silica $Na_2O \cdot Al_2O_3 \cdot 2SiO_2 \cdot 4\text{-}5H_2O$
hydrated sodium alumino-silicate Upon dehydration, e. g., calcining in air at 700° F., most of the water is driven out of the crystal structure and the resulting crystalline solid can then adsorb molecules whose diameters are not greater than about 4 A.

Using sodium aluminate the principal reaction is as follows:

(2) $2NaAlO_2 \cdot 3H_2O + 2SiO_2 \cdot xH_2O \xrightarrow{\text{water}} Na_2O \cdot Al_2O_3 \cdot 2SiO_2 \cdot 4\text{-}5H_2O$
   sodium
  aluminate However, because of the solubilizing quantity of free sodium hydroxide conventionally present in commercial sodium aluminate, e. g., about 2–5% of free NaOH by weight of the aluminate, it is necessary to add additional hydrous silica above the proportion shown in Equation 2, above, and some hydrous alumina to the reaction mixture to balance stoichiometrically this solubilizing quantity of sodium hydroxide for making the desired formulation. The additional hydrous alumina and silica react with the solubilizing caustic soda according to Equation 1, above.

The reaction mixture is maintained at about 150°–280° F. and autogenous pressure for at least about 3 hours and preferably for about 4–24 hours. Reaction time of 4 or more hours appears to give a crystalline particle of sufficient size to facilitate eventual separation. At temperatures substantially below about 150° F. the reaction is sluggish, and substantially above about 325° F. the synthetic sorbent is not likely to be formed in the desired highly pure state, but rather some analcite, a distinctly inferior selective sorbing material, will be formed in contaminating quantities along with other impurities. Preferably, the temperature is maintained between 220° and 275°–280° F. for a period of 4–24 hours in a closed reactor whereby water vapors are confined and exert pressure. On a large scale preparation mechanical agitation of the reaction mixture is desirable, but on a small scale it is not necessary to agitate.

At the end of the reaction period the resulting hydrated 4 A. crystalline sodium alumino-silicate $$Na_2O \cdot Al_2O_3 \cdot 2SiO_2 \cdot 4\text{--}5H_2O$$

is present as a solid fraction and is separated from the mother liquor most simply by filtration. Other solids separation techniques such as settling, centrifuging, or the like can be used also to separate the crystalline solid fraction. The separated solid is preferably washed with water or a light organic solvent such as alcohol or acetone to remove occluded foreign material, and can be air-dried conveniently to remove extraneous dampness (other than the 4–5 molecules of water of hydration).

The separated hydrated 4 A. sodium alumino-silicate material is conveniently virtually completely dehydrated simply by calcining in air at a temperature between 220° and 1000° F. Use of temperatures substantially above about 1000° F. in this operation causes collapse of the structure and loss of sorptive properties. Preferably, for efficiency and economy in dehydration, the temperature used is 300°–600° F. If desired, sub-atmospheric pressure can be used, but atmospheric pressure dehydration is preferred. It is advantageous during dehydration to sweep water vapor from the heater with a current of air or other gas.

The resulting dehydrated mineral sorbent, having the formula $Na_2O \cdot Al_2O_3 \cdot 2SiO_2$ and containing no appreciable water, is a fine crystalline powder. For sorption of vapors the fine particles are best agglomerated, e. g., by pelleting or extruding through a die with a suitable binder. The fine particles can be agglomerated and stabilized for greater strength, for example, by processes described in the following copending U. S. patent applications: Riordan et al., Serial No. 544,244, filed on November 1, 1955, assigned to The Texas Company; Hess et al., Serial No. 544,185, filed on November 1, 1955, also assigned to The Texas Company; and Ray, Serial No. 599,231, filed on July 20, 1956, also assigned to The Texas Company.

Figure 1 is a reproduction of a typical X-ray diffraction pattern of a fully hydrated sodium alumino-silicate made by my process using silica hydrogel, sodium aluminate, and alumina hydrogel reaction mixture maintained at about 280° F. for 32 hours. The X-ray diffraction pattern does not agree with that of any of more than 1,000 natural minerals and synthetic chemicals available for comparison.

The hydrated 4 A. mineral sorbent can be converted to a calcium sodium alumino-silicate, $$(Ca, Na_2)O \cdot Al_2O_3 \cdot 2SiO_2 \cdot 4\text{--}5H_2O$$

having an effective pore size or diameter of about 5 Angstrom units by base exchanging sodium in the structure for calcium, and thereafter dehydrating as described hereinbefore. In such operation at least 25% and preferably 40–80% of the sodium in the original 4 A. material should be replaced by calcium. A simple way to conduct the base exchange is to wash the uncalcined, hydrated sodium alumino-silicate substantially free of any retained alkali with water, then agitate it for ½ hour to two days in, for example, 0.1 to 5 N aqueous calcium chloride solution, discarding the calcium chloride solution and repeating this treatment with fresh calcium chloride solution until the necessary proportion of the sodium originally present in the structure has been replaced by calcium. Operating at room temperature and pressure five changes of 0.1 N calcium chloride solution are usually adequate to obtain sufficient calcium substitution. After calcining, the resultant 5 A. mineral sorbent can be agglomerated and/or stabilized as hereinbefore set forth.

Figure 2:
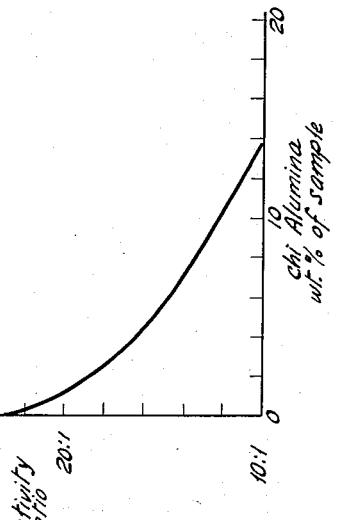

Figure 2 shows how the selectivity of such 5 A. sorbent for straight chain hydrocarbons can be drastically impaired as the weight percentage of chi alumina increases in admixture with this 5 A. zeolitic mineral; it demonstrates graphically one aspect of the need for maintaining essentially stoichiometric proportions of reactants in preparation of the 4 A. parent sorbent therefor. Selectivity ratio used here is defined as the quotient of the ml. of normal butane sorbed per gram of sorbent at 760 mm. Hg total pressure and 75° F. divided by the ml. of isobutane sorbed per gram of the sorbent under the same conditions. As little as 10% by weight chi alumina can approximately halve the selectivity of the sorbent for the normal hydrocarbon, impair the normal paraffin sorbing capacity of the zeolite, and about double the isoparaffin contamination of the product stream when the hydrocarbons are desorbed from zeolite.

The following examples show ways in which my invention has been practiced, and should not be construed as limiting the invention. The X-ray diffraction patterns of the hydrated sodium alumino-silicates produced in each of the following preparations did not differ significantly from the pattern shown in Figure 1.

*Example 1*

A reaction mixture was made of the following materials: 750 grams of silica hydrogel containing 55.4 grams of $SiO_2$; 255 grams of alumina hydrogel containing 46.9 grams of $Al_2O_3$; and 36.9 grams of C. P. sodium hydroxide (28.6 grams $Na_2O$ equivalent). The ratios of $Na_2O/Al_2O_3/Si_2O_2$ were 1/1/2. 890 grams of this reaction mixture was maintained at temperature of 286°–325° F. under autogenous pressure of 54–97 p. s. i. g. for about 38 hours in a 1740 ml. vessel without agitation. At the end of this period the resulting crystalline solid fraction was separated and air-dried, this product being 119 grams of the synthetic zeolite $$Na_2O \cdot Al_2O_3 \cdot 2SiO_2 \cdot 4\text{--}5H_2O$$

*Example 2*

A reaction mixture was made of the following materials: 1588 grams of silica hydrogel containing 117.4 grams of silica; 196 grams of sodium aluminate (equivalent to 53.3 grams $Na_2O$, 87.8 grams $Al_2O_3$, 9.8 grams of free NaOH and 45.1 grams of $H_2O$); 60 grams of alumina hydrogel containing 11.1 grams of $Al_2O_3$; and 200 ml. of water. The ratios $Na_2O/Al_2O_3/Si_2O_2$ were 1.01/1.0/2. 1299 grams of the mixture was charged into a pressure vessel of 1740 ml. capacity. The material was held at temperature of 285°–311° F. under autogenous pressure of 52–78 p. s. i. g. for 11 hours. At the end of this period the resulting crystalline solid fraction was separated and air-dried, this product being 193 grams of the synthetic zeolite $Na_2O \cdot Al_2O_3 \cdot 2SiO_2 \cdot 4-5H_2O$.

*Example 3*

The following reaction mixture was made: 410 grams of "Ludox brand" silica hydrosol containing 116.9 grams of silica and 1.6 grams of sodium hydroxide; 580 grams of alumina hydrogel containing 99.2 grams $Al_2O_3$; 85.6 grams of sodium hydroxide equivalent to 66.3 grams of $Na_2O$; and 214 ml. of water. 1132 grams of mixture was charged into a pressure vessel having a capacity of 1740 ml. and maintained therein for 60 hours at temperature from 232° to 248° F. at autogenous pressure of 21–29 p. s. i. g. At the end of this period the resulting crystalline solid fraction was separated and air-dried, this product being 305 grams of the synthetic zeolite $Na_2O \cdot Al_2O_3 \cdot 2SiO_2 \cdot 4-5H_2O$.

A sample of this hydrated sodium alumino-silicate was treated for three successive periods of 7 to 8 hours each with aqueous 5 N calcium chloride solutions at the boiling point and so converted into a calcium-sodium aluminosilicate, $(Ca, Na_2)O \cdot Al_2O_3 \cdot 2SiO_2$, hydrated to the extent of about 4.3 mols of water per silicate molecule. The hydrated calcium-sodium product was then mixed with 5% by weight of "Sterotex," (the trade name for a hydrogenated vegetable fat); mixture was formed into pellets which were then calcined for 2 hours at 400° F. and subsequently for 3 hours at 700° F. in order to completely dehydrate the silicate and to burn out Sterotex binder. Capacity of the calcined pellets at 75° F. and 760 mm. Hg pressure, in cc. of gas per gram of pellets, was tested and found to be 47 for normal butane and 5.5 for isobutane.

A sample of the pellets was then used to upgrade a quantity of high octane motor naphtha, the product of reforming hydrocarbons with a platinum-on-alumina catalyst. The naphtha vapors were passed over a bed of the pellets at atmospheric pressure and 425° F. using a liquid hourly space velocity of 1 (calculated as volume of liquid naphtha per volume of solid pellets per hour). This treatment raised the octane number of the naphtha from 88 to 90.6, reflecting the removal of straight chain hydrocarbons from the naphtha.

*Example 4*

The following reaction mixture was made: 155.4 grams of dry powdered Hi-Sil-233 (the trade name for a finely-divided amorphous silica) analyzing 87% $SiO_2$, 0.5% CaO, 0.2% $Fe_2O_3$, 0.6% $Al_2O_3$, 1.0% NaCl, said Hi-Sil containing 135.2 grams $SiO_2$; 226 grams of commercial grade sodium aluminate (95% $2NaAlO_2 \cdot 3H_2O$ and 5% NaOH); 86.7 grams of alumina hydrogel containing 14.4 grams of $Al_2O_3$; and 1675 ml. of water. The ratios $Na_2O/Al_2O_3/SiO_2$ were 1/1/2. 1300 grams of the mixture were charged into a pressure vessel of 1740 ml. capacity and maintained for 20 hours at 270°–277° F. under autogenous pressure of 42–47 p. s. i. g. At the end of this period the resulting crystalline solid fraction was separated and air-dried, this product being 240 grams of the synthetic zeolite $Na_2O \cdot Al_2O_3 \cdot 2SiO_2 \cdot 4-5H_2O$.

*Example 5*

The following reaction mixture was made: 79.3 grams of Hi-Sil-233 (previously described) containing 69 grams of $SiO_2$; 1000 grams of alumina hydrogel, containing 58.6 grams of $Al_2O_3$; and 46 grams of NaOH. The ratios $Na_2O/Al_2O_3/SiO_2$ in the reaction mixture was 1/1/2. 1005 grams of above mixture was maintained in a reactor for 58 hours at 270°–280° F. under autogenous pressure of 42–50 p. s. i. g. At the end of this period the resulting crystalline solid fraction was separated and air-dried, this product being 170 grams of the synthetic zeolite $Na_2O \cdot Al_2O_3 \cdot 2SiO_2 \cdot 4-5H_2O$.

I claim:

1. A process of forming synthetic crystalline zeolite characterized by the empirical formula $Na_2O \cdot Al_2O_3 \cdot 2SiO_2 \cdot 4-5H_2O$ and an effective pore size of 4 A. upon dehydration which comprises: maintaining an aqueous mixture of at least one soda-providing substance selected from the group consisting of sodium hydroxide and sodium aluminate, at least one alumina-providing substance selected from the group consisting of hydrous alumina and sodium aluminate, and at least one silica-providing substance selected from the group consisting of hydrous silica and finely-divided amorphous silica, said mixture containing essentially stoichiometric quantities of aluminum, silicon, and sodium for the formulation $Na_2O \cdot Al_2O_3 \cdot 2SiO_2$, at temperature of 150°–325° F. and autogeneous pressure for at least about 3 hours; thereafter recovering said zeolite as the resulting solid fraction.

2. The process of claim 1 wherein the temperature of said aqueous mixture is maintained between 220° and 280° F. for 4–24 hours.

3. The process of claim 2 wherein the alumina-providing substance is hydrous alumina, and the soda-providing substance is sodium hydroxide.

4. The process of claim 2 wherein the silica-providing substance is a hydrous silica.

5. The process of claim 2 wherein the silica-providing substance is a solid finely-divided amorphous silica.

6. The process of claim 2 wherein the preponderant alumina-providing substance used is sodium aluminate containing a solubilizing quantity of sodium hydroxide, and said solubilizing quantity of sodium hydroxide is compensated for by incorporating hydrous alumina into said mixture.

References Cited in the file of this patent

UNITED STATES PATENTS 1,945,838    Vaughan _____ Feb. 6, 1934